United States Patent Office 3,554,859
Patented Jan. 12, 1971

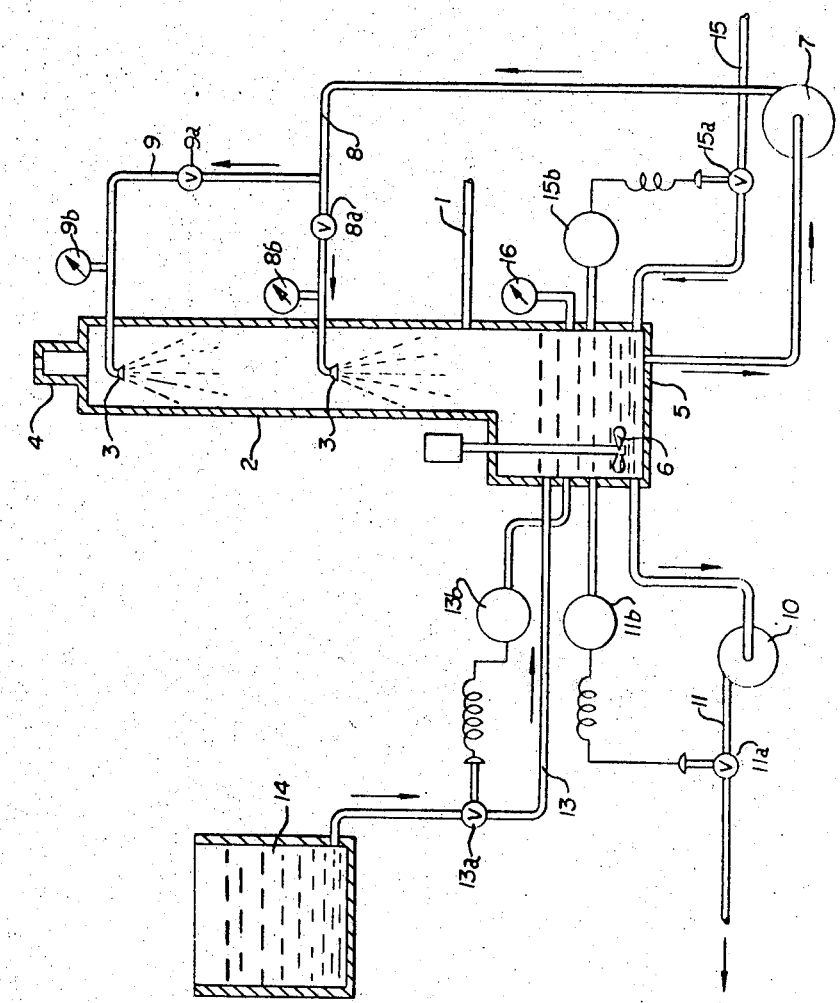

3,554,859
PROCESS FOR RECOVERY OF SULPHUR FROM FURNACED BLACK LIQUOR
Francis E. Murray, Richmond, British Columbia, Canada, assignor to British Columbia Research Council, Vancouver, British Columbia, Canada
Continuation-in-part of application Ser. No. 465,406, June 21, 1965. This application July 10, 1968, Ser. No. 743,768
Int. Cl. D21c 11/12, 11/14, 11/02
U.S. Cl. 162—30               6 Claims

ABSTRACT OF THE DISCLOSURE

Sulphur containing compounds are recovered from sulphur and $CO_2$ containing gases from the furnacing of cooking liquor in the kraft or sodium base sulphite process by mixing the gases with air and an oxygen-containing gas and contacting the mixture with an aqueous alkaline solution containing at least one molar concentration of sodium ions while maintaining the pH of the solution at 9.0 or above and the temperature thereof at about 135° to 180° F.

---

This is a continuation-in-part application of application Ser. No. 465,406, filed June 21, 1965, and now abandoned.

The present invention relates to the retention of sulphur in a kraft or sodium base sulphite pulp process by the recovery of sulphur compounds from the furnace gases such as $H_2S$ and $SO_2$ obtained by furnacing the cooking liquor in the recovery stage.

In the conventional kraft process, wood chips are digested in a cooking liquor which is an aqueous solution containing sodium hydroxide and sodium sulphide. After the digestion is complete the digester is blown and the pulp separated from the spent digestion liquor (i.e. black liquor). The black liquor is then sent to a recovery process in which it is concentrated in an evaporation stage and furnaced in a furnacing stage. Usually make up sodium sulphate (salt cake) is added either just before the evaporation stage or just before the furnacing stage. In the furnace the organic matter, obtained by digestion of the wood chips, contained in the concentrated black liquor is burnt and a smelt is formed which is dissolved in water to form a raw green liquor. The insoluble impurities contained in the raw green liquor are then allowed to settle to form a sludge and the supernatant liquor (i.e. the clarified green liquor) is then causticized by the addition of slaked lime. The resultant slurry is filtered, the carbonate sludge being sent to a lime kiln for calcination to quicklime for reuse in the causticization step and the filtrate (white liquor) which contains sodium hydroxide and sodium sulphide, along with minor amounts of sodium carbonate, sodium sulphate, sodium sulphite and thiosulphate is then recycled to the cooking liquor for digesting further the wood chips.

In the sodium base sulphite process the cooking liquor used comprises a solution containing a mixture of sodium ions, sulfite ions, hydrosulfite ions and sulfur dioxide, the relative amounts of each depending upon the pH of the solution. The spent cooking liquor may, as in the kraft process, be concentrated in evaporators and then furnaced.

However, in the furnacing of the cooking liquor and for that matter the evaporation of the cooking liquor, the gases given off and passed up the furnace stack contain inter alia sulphur containing compounds such as $SO_2$, $H_2S$, and mercaptans which besides being lost to the process and therefore adversely affecting the economics thereof, pollute the atmosphere which is undesirable.

The present invention provides a process in which the sulphur containing compounds in the gases emanating from the furnacing and also desirably the evaporation of the cooking liquor are recovered and recycled to the pulping process.

The absorption of $H_2S$, $SO_2$, and other acidic gases in alkaline solution has been known for many years. However the absorption of sulphur containing acidic gases generated in the furnacing of the cooking liquor in the kraft or sodium base sulphite processes poses a number of special problems. Thus, the gases emanating from the furnace which contain the sulphur containing compounds, e.g. 100 to 1000 p.p.m., $H_2S$ usually contain in addition large volumes of carbon dioxide of the order of 10 to 14% produced by the combustion of organic matter in the cooking liquor and the reaction of the carbon so produced with the salt cake. If acidic sulphur containing gases such as hydrogen sulphide contained in the furnace gases are merely absorbed in an aqueous alkaline solution the absorption quickly decreases due to an increase of the sulphide ion concentration in the absorbing solution and a simultaneous decrease in the pH of the solution due to the absorption of large amounts of carbon dioxide contained in the furnace gases. Consequently, the equilibrium partial pressure of the hydrogen sulfide above the alkaline solution soon becomes equal to the partial pressure of the hydrogen sulfide in the gas stream and no further absorption takes place. Thus merely the use of an alkaline solution to remove the sulphur containing compounds from the furnace gases is at best an inefficient process and could not be applied on a commercial scale.

Applicant has found however that by absorbing the sulphur compounds contained in the gases from the furnacing of the cooking liquor in an aqueous alkaline solution containing at least one molar concentration of sodium ions and preferably carbonate or bicarbonate ions or both and maintaining the pH thereof about 9.0 and above, and the absorption temperature at about 135° to 180° F., continuous absorption of the sulphur containing compounds may be achieved through the removal of the absorbed sulphide ions in the aqueous solution by oxidation with an oxygen containing gas. The principal oxidation product is the thiosulphate ion with lesser amounts of sulphate and sulphite ions as well as minor amounts of elemental sulphur which are preferably kept to a minimum.

According to the present invention therefore, there is provided in a process for the production of digested wood pulp which includes digesting wood in an aqueous cooking liquor containing sodium ions and sulphide or sulphite ions or both, separating the digested pulp from the cooking liquor and sending the cooking liquor to a recovery stage in which it is furnaced, the improvement which comprises contacting the furnace gases, in the presence of a molecular oxygen containing gas, with an aqueous alkaline solution containing at least one molar concentration of sodium ions thereby absorbing and oxidizing the hydrogen sulfide present in the gas while maintaining the pH of said aqueous solution at about 9.0 or above and the absorption temperature of the solution at about 135° to 180° F. and recycling said solution containing the absorbed gas to the process whereby to return the sulphur containing compounds in said gases to the process.

Further, it has been found that the addition of ferric oxide to the aqueous alkaline obsorbing solution promotes even greater efficiency of absorption by maintaining the sulphide concentration in the solution at a very low level. In this case it is believed that the sulphur containing gases which have been absorbed react with some of the ferric ions to form ferrous ions which precipitate any sulphide in the solution as ferrous sulphide which is then oxidized back to ferric ion and the thiosulphate ion by the oxygen containing gas. It is now only necessary to recycle the absorbing solution back to the pulping process to ensure the retention of sulphur therein.

The aqueous alkaline absorption solution may be any aqueous solution which has a sodium ion molar concentration of at least about one and a pH about 9.0 and above and is desirably an aqueous solution containing sodium carbonate and sodium hydroxide or sodium carbonate and sodium bicarbonate and which may in addition contain ferric oxide. A sodium ion molar concentration of at least one is required in order to maintain the pH level throughout the absorption process. The maximum concentration of sodium ion should of course be kept at below the level at which a precipitate of sodium bicarbonate forms. The absorption and oxidation is conveniently carried out by mixing the sulphur containing gases with an air-stream and introducing the mixture thus formed into a conventional scrubber employing as a scrubbing liquor the aqueous solution. If desired, the air may not be added to the sulphur containing gases prior to the latter entering said scrubber, in which case, the oxidation can be effected by contacting of the scrubbing solution with air in a separate gas-liquid reactor. Further, it is desirable to incorporate in the aqueous alkaline solution insoluble metal hydroxides of manganese, cobalt, nickel or copper which have been found to enhance the absorption of the sulphur containing gases in the solution.

It is a critical feature of the present invention that the pH of the aqueous alkaline solution is maintained about 9.0 and above throughout the absorption, for if the pH falls below this limit, the absorption is found to deteriorate rapidly. As aforementioned the pH may suitably be maintained by utilizing an aqueous solution containing a molar concentration of sodium ions of at least about one as by the addition of sodium hydroxide or sodium carbonate to the aqueous solution and the aqueous solution which contains the sulphur compounds is removed and recycled to the process preferably just prior to the furnacing or the evaporation stage. Thus addition and withdrawal is desirably effected on a continuous basis.

The gases are absorbed in the aqueous solution at a temperature from about 135° to 180° F. It has been found that maintaining the aqueous alkaline solution at this elevated temperature while at a pH of at least 9.0 and a molar concentration of sodium ions of at least one, essentially prevents the absorption of carbon dioxide in the solution. Adsorption of carbon dioxide in the solution has been found to drop the pH level of the solution below 9.0 thereby preventing the effective absorption of hydrogen sulfide. The elevated temperature at which the aqueous alkaline solution is maintained is also important since it precludes or significantly reduces the formation of elemental sulfur in the oxidation product which tends to form when say temperatures below about 135° F. are employed. The formation of elemental sulfur is undesirable in the process of the invention since it causes plugging and packing distributor systems in the absorption unit.

In addition to preventing the absorption of carbon dioxide, the process of the invention operates to substantially increase hydrogen sulfide absorption by maintaining the equilibrium partial pressure of the hydrogen sulfide at a level near zero. The low level of hydrogen sulfide equilibrium partial pressure is maintained by reducing the effective total concentration of sodium sulfide in the absorbing solution and by maintaining the pH of the aqueous solution at 9.0 or above. The effective total concentration of sodium sulfide is kept at a level near zero by the oxidation of the hydrogen sulfide absorbed in the solution. Advantageously, the oxidation is carried out in the presence of small catalytically effective amounts of ferric oxide sufficient to further increase the absorption of hydrogen sulfide.

The present invention will be further illustrated with reference to the accompanying drawing in which the figure is a flow diagram of a process for recovering the sulphur compounds in the furnace gases according to one embodiment of the present invention.

The sulphur containing gases from the furnacing of the cooking liquor in the kraft or sodium base sulphite process are mixed with air and passed through line 1 to the bottom of a conventional scrubbing tower 2 up which the mixture passes countercurrent to an aqueous solution containing sodium carbonate and sodium bicarbonate in at least about one molar concentration of sodium ions which solution is sprayed into the tower 2 through spray inlets 3. The scrubbed gases leave the tower 2 through a chimney 4. The aqueous solution falling down the tower 2, at a temperature from about 135° to 180° F., absorbs the sulphur containing compounds from the gases and the air present oxidizes the sulphur containing compounds primarily to thiosulphates with smaller amounts of sulfates and sulphites also being formed. The aqueous solution containing the oxidized sulphur compounds falls into a reservoir 5 which is maintained homogeneous by a stirrer 6.

From the reservoir 5 the aqueous solution is continuously recycled by the pump 7 through lines 8 and 9 to the spray inlet 3 in the tower 2, the flow of liquid through said lines 8 and 9 being controlled as desired by valves 8a and 9a. The pressure in lines 8 and 9 is indicated on gauges 8b and 9b. After the process has been in operation for a time sufficient for substantial amounts of thiosulphate to be present in the circulating aqueous solution, a portion thereof is continually pumped off by pump 10 through line 11 to a storage tank (not shown) for return to the evaporation stage of the kraft of sodium base sulphite process. The flow of liquor through line 11 is controlled by the valve 11a which is actuated from the reservoir 5 by the inlet control 11b.

The pH of the aqueous solution in the reservoir is maintained at about 9.0 or above by means of a gravity feed of sodium hydroxide or sodium carbonate from a storage tank 14 through line 13. The flow of liquid through line 13 is controlled by valve 13a which is actuated from the reservoir by a pH inlet control 13b. Make up water is also fed to the reservoir 5 through line 15, the flow being controlled by a valve 15a actuated by an inlet control 15b. The temperature of the liquid in the reservoir 5 is indicated by a sensor 16.

The present invention will be further illustrated by way of the following example:

Using the above apparatus a solution containing a molar concentration of sodium carbonate and sodium bicarbonate mixture and a molar concentration of sodium thiosulphate was used at 80° C. for the removal of $H_2S$ from a furnace gas-stream containing 9.5% carbon dioxide, 30% water vapour and air. The aqueous alkaline scrubbing solution was maintained at a pH of 9.3.

Initially the concentration of hydrogen sulphide in the inlet furnace gas was 625 p.p.m. and in the outlet gas 7 p.p.m. There was no detectable amount of sulphide ion in the scrubbing liquor.

After 7 hours it was found that the concentration of $H_2S$ in the inlet furnace gas-stream was 260 p.p.m. and in the outlet gases from the tower 10 p.p.m. No sulphide ion was detectable in the scrubbing solution indicating complete oxidation.

It is claimed:

1. In a process for the production of digested wood pulp which includes digesting wood in an aqueous cooking liquor containing sodium ions and at least one ion selected from the group consisting of sulphide and sulphite ions, separating the digested pulp from the cooking liquor and sending the cooking liquor to a recovery stage in which it is furnaced to produce gases containing hydrogen sulphide and carbon dioxide, the improvement which comprises contacting the furnace gases with a molecular oxygen-containing gas and with an aqueous alkaline solution containing at least one molar concentration of sodium ions thereby absorbing and oxidizing the hydrogen sulphide absorbed in said aqueous solution while maintaining the pH of said aqueous solution at at least about 9.0 and the temperature thereof in the range of about 135° to 180° F., and directing said solution containing the absorbed sulphide to the cooking liquor in the recovery stage.

2. A process as claimed in claim 1 in which the aqueous solution used contains sodium carbonate and sodium hydroxide.

3. A process as claimed in claim 1 in which the aqueous solution used contains sodium carbonate and sodium bicarbonate.

4. A process as claimed in claim 1 wherein said gases are mixed with air and absorbed by scrubbing with said aqueous solution.

5. A process as claimed in claim 1 wherein said gases are absorbed by scrubbing with said aqueous solution, after which oxidation is effected by contacting said solution with air.

6. A process as claimed in claim 1 wherein said gases are mixed with air and absorbed by scrubbing with said aqueous solution which contains in addition ferric oxide in an amount sufficient to increase absorption.

References Cited

UNITED STATES PATENTS

| | | | |
|---|---|---|---|
| 2,788,273 | 4/1957 | Shick | 162—36 |
| 3,006,804 | 10/1961 | De Vos et al. | 162—36 |
| 3,163,495 | 12/1964 | Greenwalt | 23—48 |
| 3,293,113 | 12/1966 | Venemark et al. | 162—30 |

FOREIGN PATENTS

| | | | |
|---|---|---|---|
| 818,572 | 8/1959 | Great Britain | 162—51 |

HOWARD R. CAINE, Primary Examiner

U.S. Cl. X.R.

21—55; 23—48; 162—36, 51